US008144194B2

(12) United States Patent
Flohr et al.

(10) Patent No.: US 8,144,194 B2
(45) Date of Patent: Mar. 27, 2012

(54) CONTROLLING AN IMAGING APPARATUS OVER A DELAYED COMMUNICATION LINK

(75) Inventors: Myriam Flohr, Even Yehuda (IL); Avi Meidan, Caesaria (IL); Yaniv Shoshan, Ein Yiron (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 12/937,433

(22) PCT Filed: Feb. 3, 2010

(86) PCT No.: PCT/IL2010/000095

§ 371 (c)(1),
(2), (4) Date: Oct. 12, 2010

(87) PCT Pub. No.: WO2010/089738

PCT Pub. Date: Aug. 12, 2010

(65) Prior Publication Data

US 2011/0026774 A1 Feb. 3, 2011

(30) Foreign Application Priority Data

Feb. 5, 2009 (IL) .......................................... 196923

(51) Int. Cl.
*H04N 7/18* (2006.01)
*H04N 5/225* (2006.01)

(52) U.S. Cl. ........................................ 348/144; 348/169

(58) Field of Classification Search .................. 348/144, 348/169

See application file for complete search history.

(56) References Cited

U.S. PATENT DOCUMENTS

| | | | | |
|---|---|---|---|---|
| 7,184,574 | B1 * | 2/2007 | Zahavi | 382/103 |
| 7,782,247 | B1 * | 8/2010 | VanLaningham et al. | 342/118 |
| 2002/0097635 | A1 * | 7/2002 | LaRosa et al. | 367/130 |
| 2004/0006424 | A1 * | 1/2004 | Joyce et al. | 701/207 |
| 2006/0058954 | A1 * | 3/2006 | Haney | 701/209 |

FOREIGN PATENT DOCUMENTS

| | | |
|---|---|---|
| EP | 1048704 | 7/1985 |

OTHER PUBLICATIONS

International Search Report dated Aug. 4, 2010.
Written Opinion dated Aug. 4, 2010.

* cited by examiner

*Primary Examiner* — David Czekaj
*Assistant Examiner* — Anner Holder
(74) *Attorney, Agent, or Firm* — The Law Office of Michael E. Kondoudis

(57) ABSTRACT

Method that includes: enabling the user to track a user-identified target on a currently presented image of periodically transmitted images from an imaging apparatus; calculating a distance between the estimated location of the user-identified target in view of the user's tracking and the estimated location of the pointing point of the imaging apparatus at said future time, wherein the estimation relate to a future time by which a command control currently transmitted by the user reaches the imaging apparatus; and calculating a command control required for s directing the pointing point of the imaging apparatus onto the user-identified target, based on said calculated distance, the estimated average velocity of the user-identified target and further based on all previous control commands that had been already transmitted by the user but have not yet affected the currently presented image due to the delay in the communication link.

19 Claims, 7 Drawing Sheets

(Existing Art)

CONTROLLING AN IMAGING APPARATUS OVER A DELAYED COMMUNICATION LINK

BACKGROUND

1. Technical Field

The present invention relates to the field of remote controlling, and more particularly, to remote controlling over a delayed communication link via a vision display.

2. Discussion of the Related Art

Prior to setting forth the background of the related art, it may be helpful to set forth definitions of certain terms that will be used hereinafter.

The term "remotely piloted aircraft" (RPA) or "unmanned aerial vehicle" (UAV/RPA) as used herein in this application, refers to an aircraft flying without a human pilot. A UAV/RPA may be remotely controlled or fly autonomously based on pre-programmed flight plans or more complex dynamic automation systems. UAVs/RPAs are currently used in a number of military roles, including reconnaissance. They are also used in a small but growing number of civil applications such as firefighting when a human observer would be at risk, police observation of civil disturbances and crime scenes, and reconnaissance support in natural disasters.

The term "payload" as used herein in this application, is the load carried by an UAV/RPA exclusive of what is necessary for its operation. The payload may comprise, inter alia, an imaging apparatus that provides the user of the UAV/RPA with a dynamic vision display (e.g. a video sequence). The vision display may comprise a predefined point that corresponds with the general pointing point of the payload. The pointing point may be indicated in a particular graphic manner (e.g., a cross) so that the user will be informed of the current pointing direction of the payload.

The term "transponder" as used herein in this application, refers to a communication relay unit, usually in the form of a communication satellite that enables long range communication between the user and the remotely controlled UAV/RPA.

FIG. 1 is a high level schematic diagram showing a communication link between a user and a remote controlled unmanned aerial vehicle (UAV/RPA). A user (not shown) is in operative association with a control station 10 that is in direct communication with a transponder such as a communication satellite 20. Communication satellite 20 is in direct communication with UAV/RPA 30 that carries a payload such as an imaging apparatus 35. Between imaging apparatus 35 and a potential target 40 there is a direct line of sight. In operation, imaging apparatus 35 repeatedly captures images that may contain potential target 40. These images are transmitted to communication satellite 20 which in turn, transmits them to control station 10 thereby providing the user with a dynamic vision display (e.g. video sequence) associated with the pointing direction of imaging apparatus 35.

Remote controlling a UAV/RPA via a transponder, as discussed above usually results in a substantial delay in the communication link. The delay is constituted of two parts. The first part is an uplink delay which is the delay from the time a control command is given (and transmitted) by the user until the control command reaches the payload. The second part is a downlink delay which is a delay from the time of a particular image of the video sequence is captured until the time that particular image reaches the user.

Consequently, controlling a payload on a UAV/RPA over a delayed communication link may pose substantial challenges for UAV/RPA users. Many UAV/RPA operations require the payload to be pointed directly at user identified targets seen on the vision display.

BRIEF SUMMARY

In embodiments of the present invention, there is provided a method of enabling a user to control a pointing direction of an imaging apparatus over a delayed communication link. The method comprises: enabling the user to track a user-identified target on a currently presented image of periodically transmitted images from the imaging apparatus; calculating a distance between the estimated location of the user-identified target in view of the user's tracking and the estimated location of the pointing point of the imaging apparatus at said future time, wherein the estimation relate to a future time by which a command control currently transmitted by the user reaches the imaging apparatus; and calculating a command control required for directing the pointing point of the imaging apparatus onto the user-identified target, based on said calculated distance and further based on all previous control commands that had been already transmitted by the user but have not yet affected the currently presented image due to the delay in the communication link.

According to one aspect of the invention there is provided a computer implemented method of enabling a user to control a pointing direction of an imaging apparatus over a communication link exhibiting an uplink delay and a downlink delay, by periodically transmitting a control command for directing the imaging apparatus, wherein the imaging apparatus periodically transmits to the user an image, and wherein the transmitted image is presented to the user and contains a pointing point of the imaging apparatus, the method comprising: enabling the user to track a user-identified target on a currently presented image of the periodically transmitted images; estimating a location of the user-identified target in view of the user's tracking, at a future time corresponding with the uplink delay, wherein the uplink delay is a time required for a command control currently transmitted by the user to reach the imaging apparatus; estimating a location of the a pointing point of the imaging apparatus, at a future time related to the uplink delay; calculating a distance between the estimated location of the user-identified target and the estimated location of the pointing point of the imaging apparatus at said future time; and calculating a command control required for spatially directing the pointing point of the imaging apparatus onto the user-identified target, based on said calculated distance and taking into account all previous control commands that had been already transmitted by the user but have not yet affected the currently presented image.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings.

Figure 1:
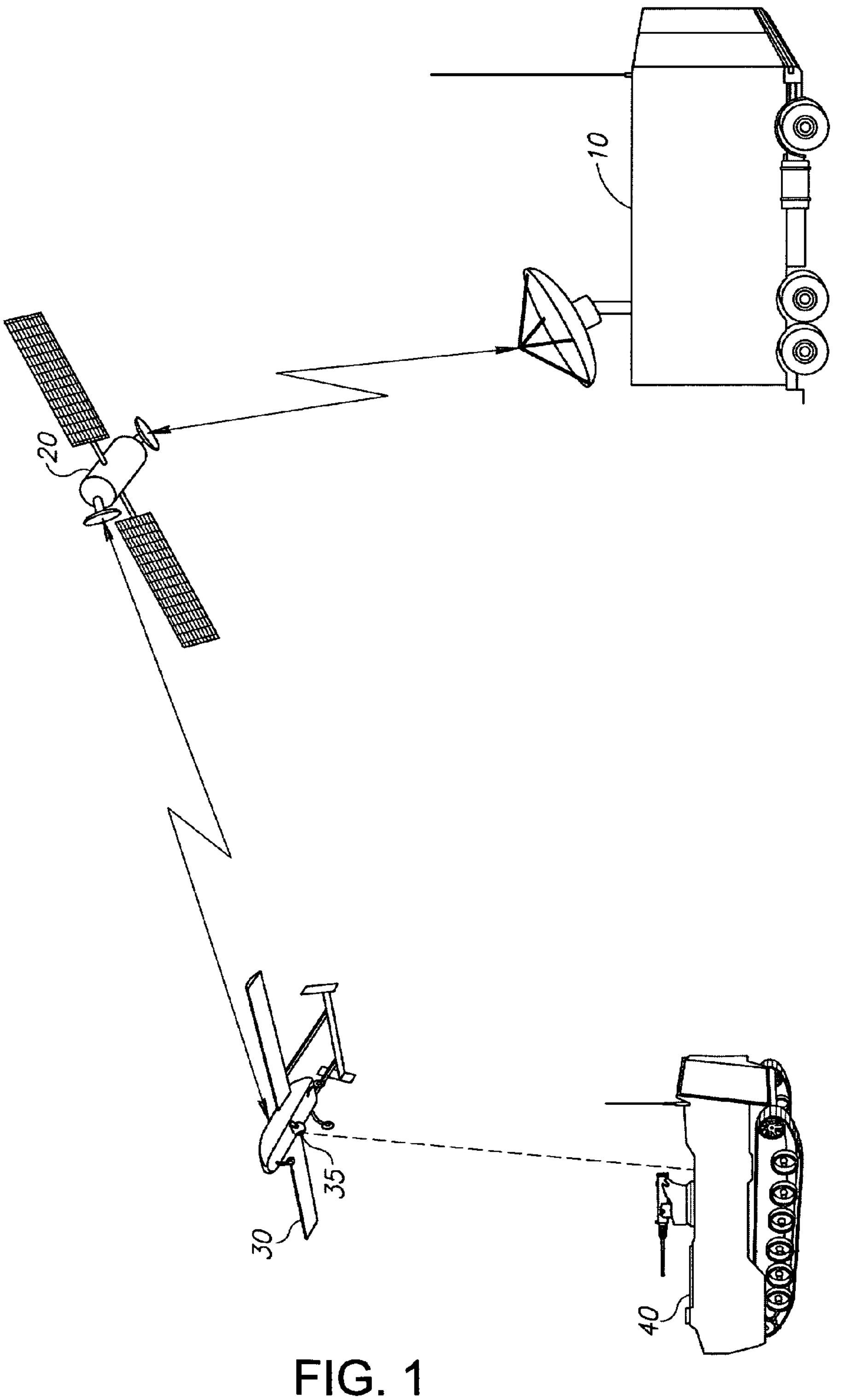
FIG. 1 is a high level schematic diagram of a unmanned aerial vehicle (UAV/RPA) controlled via a satellite according to the existing art.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention, in embodiments thereof, provides a method of enabling a user to effectively control a remotely located imaging apparatus over a communication link exhibiting a delay. Embodiments of the present invention take into account the delays involved in computing the optimal commands that need to be transmitted at any given time in order to direct the imaging device on a target identified by the user. In addition to a visual display (e.g., a video sequence exhibiting consecutive images) constantly transmitted to the user by the imaging device, the user is provided with an interface enabling him or her to track a target he or she identifies on the visual display. The tracking of the target is then used by the proposed method to estimate the location and velocity of the identified target on an image currently presented to the user, at a future time which corresponds with the time by which commands executed by the user at a current time will reach the imaging apparatus. Together with the estimation of the location of the pointing point of the imaging device at the aforementioned future time, the proposed method may calculate the required commands in order to direct the imaging apparatus onto the target. According to embodiments of the present invention, the calculated commands further take into account all previous commands that had been transmitted by the user but have not yet affected the image currently presented to the user.

Figure 2:
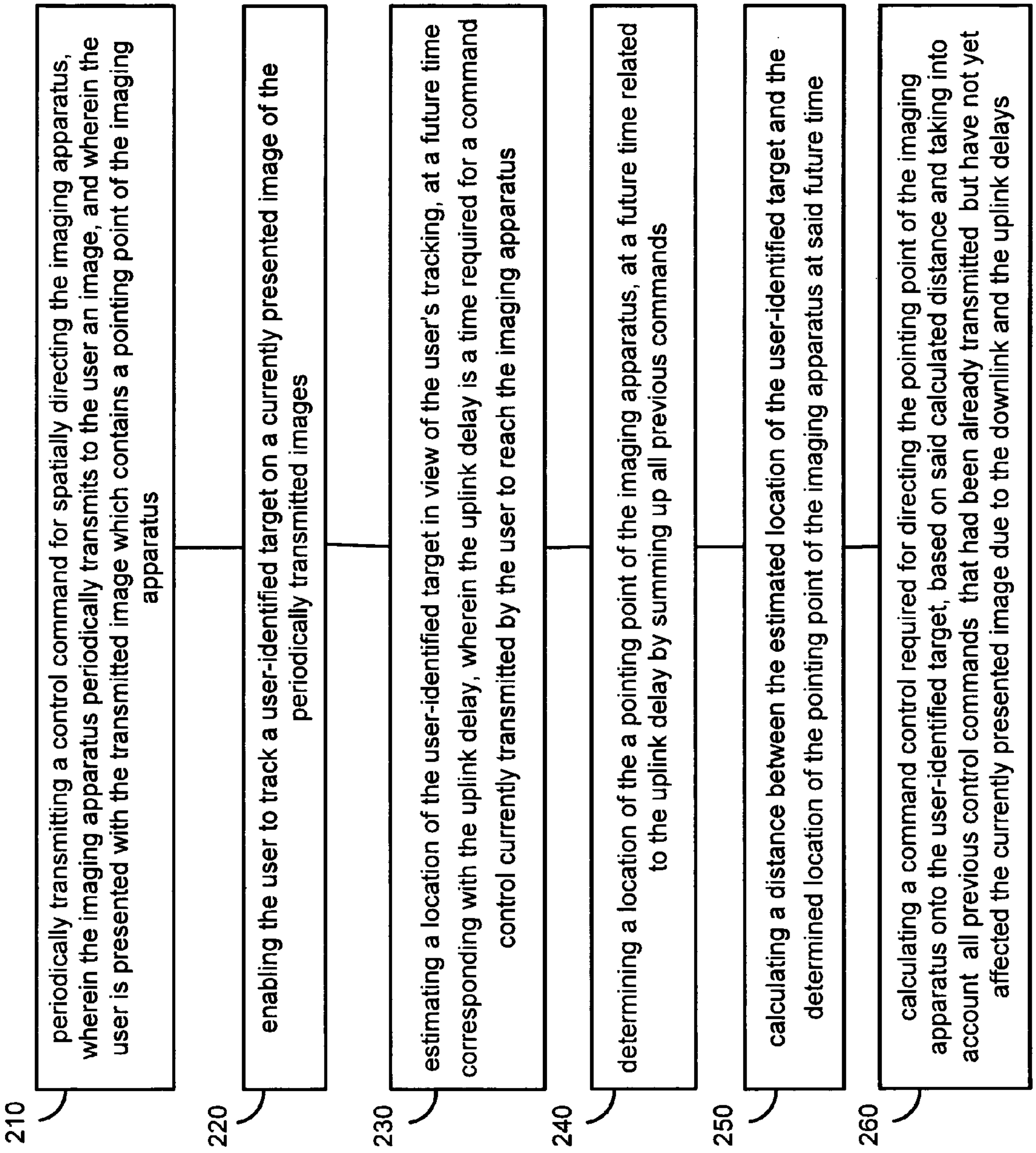
FIG. 2 is a high level flowchart showing an aspect of the method according to some embodiments of the invention.

FIG. 2 is a high level flowchart showing an aspect of the method according to some embodiments of the invention. The flowchart shows a method of enabling a user to control a spatial direction of an imaging apparatus over a communication link exhibiting an uplink delay and a downlink delay. The method comprises: periodically transmitting a control command for spatially directing the imaging apparatus, wherein the imaging apparatus periodically transmits to the user an image, and wherein the user is presented with the transmitted image which contains a pointing point of the imaging apparatus 210; enabling the user to track a user-identified target on a currently presented image of the periodically transmitted images 220 in real time; estimating a location of the user-identified target in view of the user's tracking and the command control which directed the presented image, at a future time corresponding with the uplink delay, wherein the uplink delay is a time required for a command control currently transmitted by the user to reach the imaging apparatus 230; estimating a location of the a pointing point of the imaging apparatus, at a future time related to the uplink delay 240; calculating a distance between the location of the user-identified target and the location of the pointing point of the imaging apparatus at said future time 250; and calculating a command control required for spatially directing the pointing point of the imaging apparatus onto the user-identified target, based on said calculated distance and further based on all previous control commands that had been already transmitted but have not yet affected the currently presented image due to the downlink and the uplink delays 260.

Figure 3:
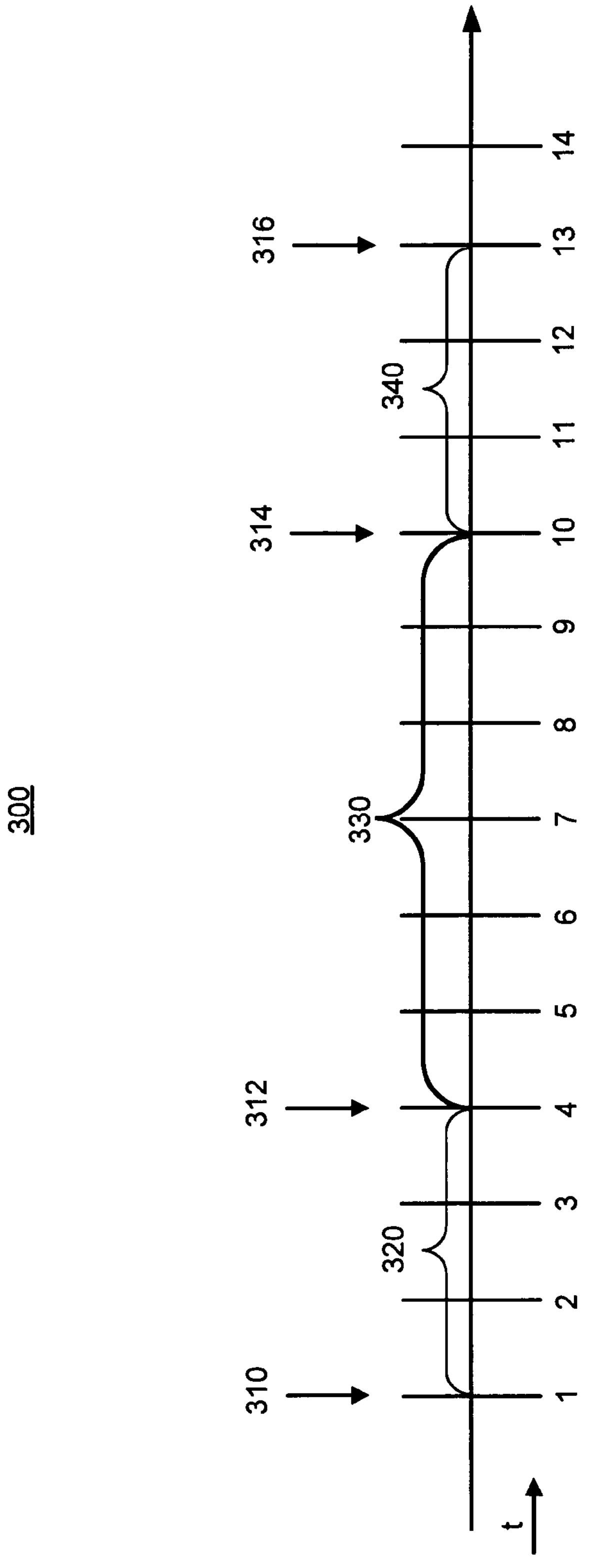
FIG. 3 is a timing diagram showing an aspect of the method according to some embodiments of the invention.

FIG. 3 is a timing diagram showing an aspect of the method according to some embodiments of the invention. Timing diagram 300 shows a time-scale exhibiting periods or cycles of operation 1-14. In each cycle, a new image from the imaging apparatus is presented to the user and further, a command control from the user may be transmitted to the imaging apparatus. As explained above, due to the delayed communication link there is a time difference between transmitting a command by the user 310 and receiving it by the imaging apparatus 312. This delay is denoted as the uplink delay 320, 340. There is also a delay due to the time difference between transmitting the image by the imaging apparatus 312 and receiving it by the user 314. This delay is denoted as the downlink delay 340. For the sake of simplicity, in the aforementioned example, receiving the command by the imaging apparatus and transmitting an image by the imaging apparatus occur at the same time.

In operation, an image that is currently presented to the user in time $t=10$ was actually obtained by the imaging apparatus and transmitted by the UAV/RPA at time $t=4$. Additionally, any command that is currently transmitted by the user at time $t=10$ will only reach the imaging apparatus at time $t=13$. Embodiments of the present invention overcome these two types of delays by taking them into account while calculating, at any given time, the required command for directing the pointing point of the imaging apparatus onto the user-identified target.

Since during the uplink delay both the pointing point of the imaging apparatus and the user-identified target will change their position, it is necessary to determine both their location at time $t=13$.

According to some embodiments of the invention, the position of the pointing point of the imaging apparatus is easily determined by summing up all the previous commands that have been already transmitted. In addition, the location of the user-identified target may be estimated by first calculating it's momentary and then average velocity under the assumption that it's velocity (a vector incorporating speed and direction) does not change substantially during the uplink delay. The momentary velocity is calculated by comparing the location of both user-identified target and pointing point of the imaging apparatus in a currently presented image to their location in a previously presented image (one period/cycle earlier). Thus an average velocity may also be calculated—several momentary velocities averaged over a predefined time such as the total delay, uplink and downlink added together.

According to some embodiments of the invention, the location of the user-identified target is determined by enabling the user to track it independently. By successfully tracking the target, the user determines at any given time and for each transmitted image, the location of the user-identified target. The tracking is enabled, by providing a graphical user interface as explained below.

Figure 4:
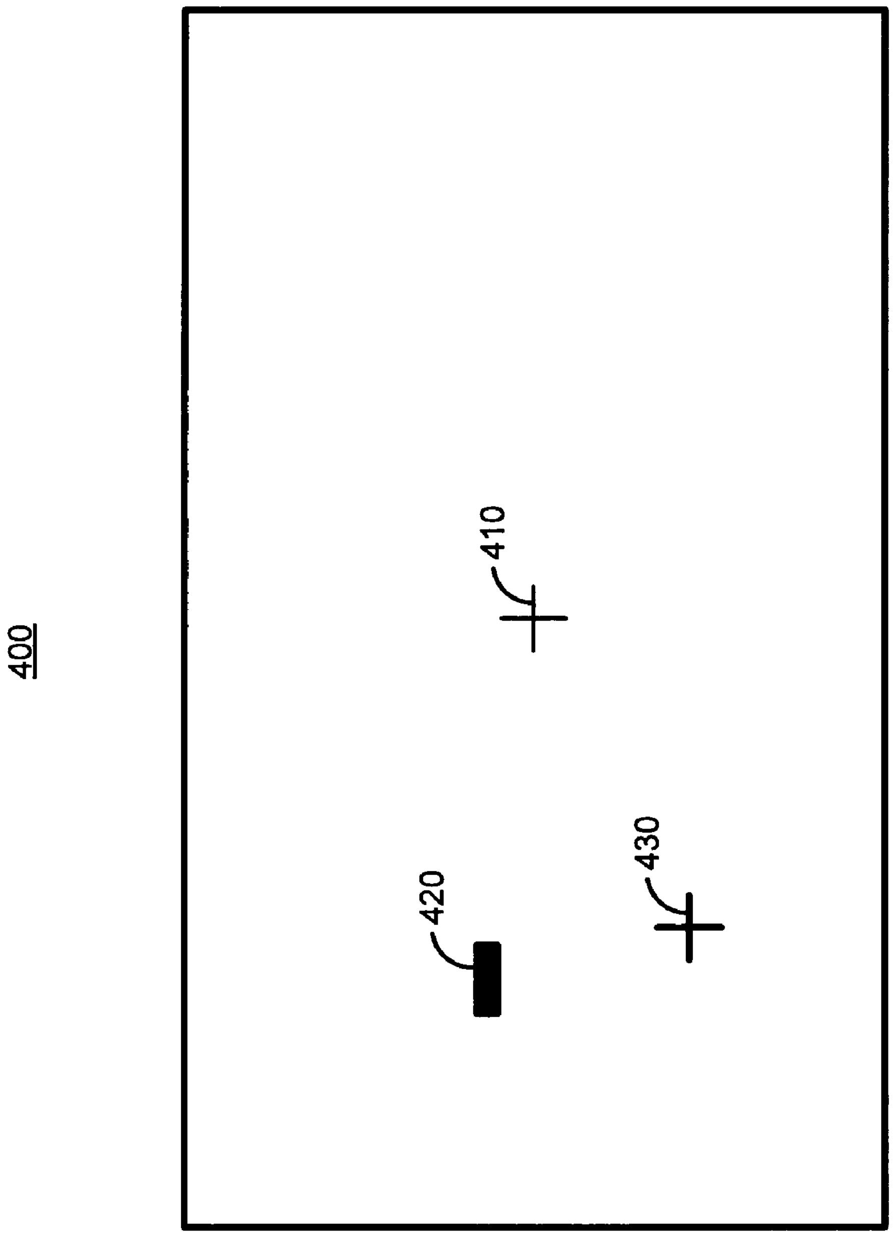
FIG. 4 is a schematic diagram of a vision display according to some embodiments of the invention.

FIG. 4 is a schematic diagram of a vision display according to some embodiments of the invention. Vision display 400 comprises a dynamically changing image, on a cycle-by cycle basis (period-by-period). Vision display 400 may be a video sequence exhibiting the optical image taken by the imaging apparatus or any other imaging technology, including radar, infrared (IR) and the like. Vision display 400 presents the images taken by the imaging apparatus which may contain a target 420 identifiable by the user. Vision display 400 also presents a pointing point which represents the pointing point of the imaging apparatus. In addition, according to some embodiments of the invention a command curser 430 is also presented to the user over vision display 400.

In operation, the user is enabled to move command curser 430 towards user-identified target 420. By tracking user-identified target 420, the user determines the location of user-identified target 420 in any given image. Thus, the location of user-identified target 420 in a currently presented image may be used for estimating it's future location at a time corresponding to the current time plus the uplink delay. In the case where the user-identified target 420 is not automatically identifiable, embodiments of the present invention enable the determination of the location of user-identified target 420 by assuming that the user will successfully track user-identified target 420 using command curser 430 after a predefined time.

Alternatively, the location of the user identified target may be determined automatically using machine vision techniques or by an external tracker. In these embodiments, the user may be enabled to provide an initial indicating only of the target upon identifying it, leaving the actual tracking for the aforementioned automatic tracking means.

Figure 5:
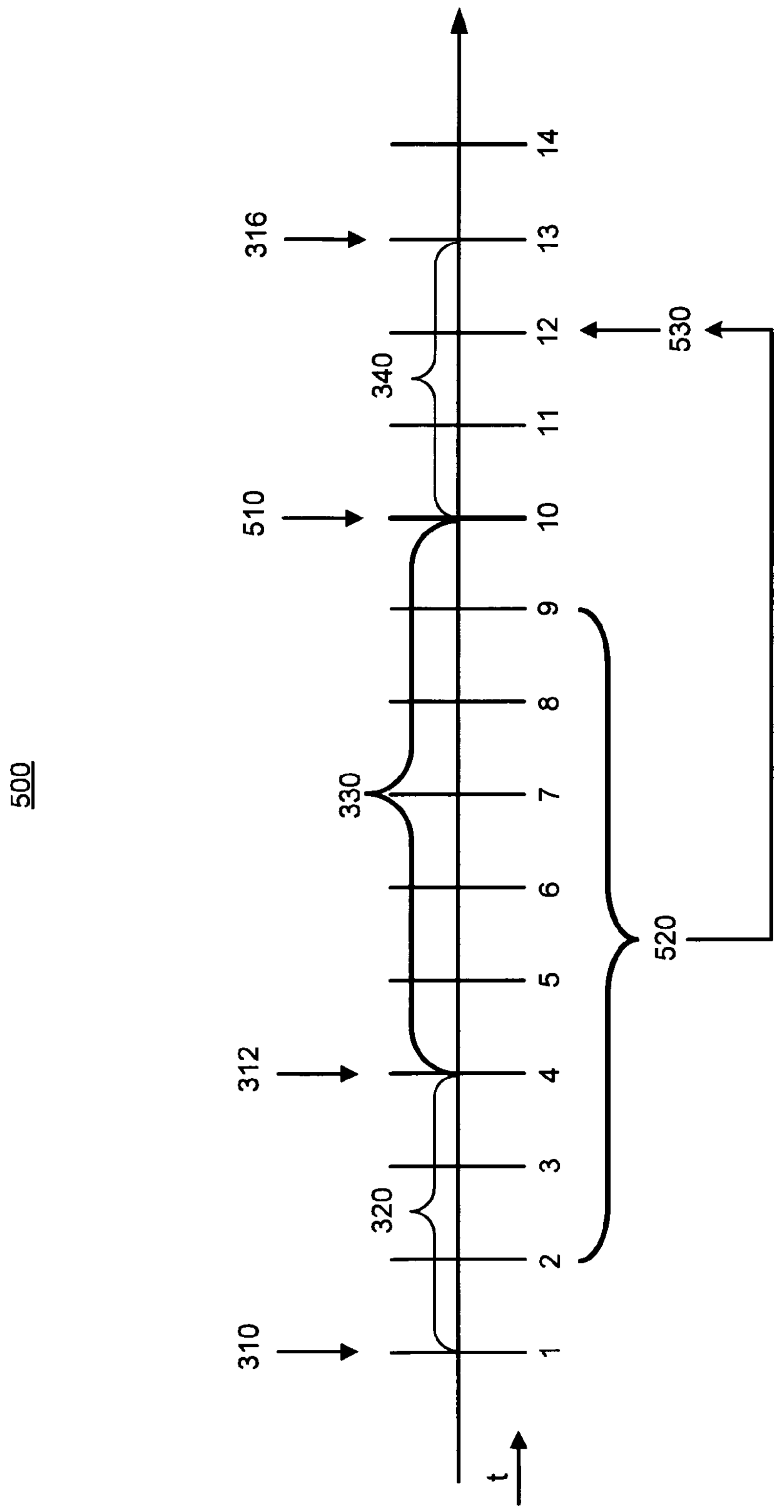
FIG. 5 is a timing diagram showing an aspect of the method according to some embodiments of the invention.

FIG. 5 is timing diagram showing an aspect of the method according to some embodiments of the invention. Similarly to FIG. 3, timing diagram 500 shows a time-scale exhibiting periods or cycles of operation 1-14. In each cycle, a new image from the imaging apparatus is presented to the user and further, a command control from the user may be transmitted to the imaging apparatus. As explained above, due to the delayed communication link there is a time difference between transmitting a command by the user 310 and receiving it by the imaging apparatus 312. This delay is denoted as the uplink delay 320, 340. There is also a delay due to the time difference between transmitting the image by the imaging apparatus 312 and receiving it by the user 314. This delay is denoted as the downlink delay 340. For the sake of simplicity, in the aforementioned example, receiving the command by the imaging apparatus and transmitting an image by the imaging apparatus occur at the same time.

Given that the currently presented image is at time t=10 510, the currently presented image was actually obtained and transmitted at time t=4 and therefore it only reflects the command (in axis X and Y) that has been transmitted by time t=1. This is because it takes an uplink delay 320 for a transmitted command to reach the imaging apparatus. Thus, commands that have been transmitted at time cycles t=2, 3, 4, 5, 6, 7, 8, and 9 would not affect the currently presented image of time t=10. Therefore, while calculating the required command to be transmitted at time t=10, two delays need to be taken into consideration. First, an estimation of the distance between the locations of both the pointing point of the imaging apparatus and the user-identified target at time t=13 (taking into account uplink delay 340) is performed in view of their respective locations in the currently presented image of time t=10 and the velocity of the user-defined target. Second, a summation of all previous commands that had been already transmitted but have net yet affected the currently presented image needs to be taken into account.

According to some embodiments of the invention, calculating a command control required for directing the pointing point of the imaging apparatus is followed by transmitting the calculated command to the imaging apparatus.

According to some embodiments of the invention, each image comprises an array of pixels and wherein distances are calculated by calculating the difference in the location of the corresponding pixels.

According to some embodiments of the invention, the differences are calculated in angular terms.

According to some embodiments of the invention, the pointing point of the imaging apparatus is located in the center of the image of the visual display.

According to some embodiments of the invention, enabling the user to track a user-identified target on a currently presented image of the periodically transmitted images is achieved and implemented by presenting a command cursor over the visual display, wherein the user is enabled to move the command curser towards the user-identified target thereby tracking it.

According to some embodiments of the invention, initially, the command cursor is located on the pointing point of the imaging apparatus.

In the reminder of the description, a potential implementation of the aforementioned method is depicted in detail according to some embodiments of the invention. The example described herein illustrates in a non-limiting manner a possible implementation of the location estimation mechanism of both the pointing point of the imaging apparatus and the user-identified target at a time that is advanced by an uplink delay from the current time.

The proposed algorithm makes use of the aforementioned user interface of a command indicator that may be moved by the user at any given time. The algorithm starts with calculating the distance between the location of the command cursor and the pointing point at the current time t. it then goes to measure the same distance in a previous cycle (period) t−1 and calculates the difference between the current and previous location distance.

Then the momentary velocity (per cycle) of the target is estimated in accordance with the following formula:

$$\text{Velocity}_{j,t}=\text{Command}_{j,t-N}+\text{Difference}_{j,t} \quad (1)$$

Wherein, in the aforementioned formula (1), Velocity is a vector denoting the velocity of the user-identified target at time t for each axis j (X and Y); Command denotes all the commands in each j axis that were transmitted at time t−N; wherein N is the total delay (uplink and downlink summed up); and wherein Difference denotes the difference between the distance between the locations of the command cursor and the pointing point at time t and the respective distance at time t−1.

Then, the estimated average velocity per cycle (period) for each axis j is being calculated in accordance with the following formula:

$$EstVelocity_{j,t} = \frac{\sum_{l=t-N}^{t} Velocity_{j,l}}{N+1} \quad (2)$$

Wherein, in the aforementioned formula (2), EstVelocity is a vector denoting the estimated average velocity of the user-identified target at time t in each axis j; Velocity is a vector denoting the velocity of the user-identified target at time t, and N denotes the number of cycles used for estimating the average velocity which, is preferably set to the number of cycles in the total delay (uplink and downlink summed up). The summation in formula (2) is over the number of cycles used for estimating the average velocity which is as noted, set to the number of cycles in the total delay.

Then, the estimated location of the target in relation to the location of the pointing point of the imaging apparatus, at time t=t+uplink−is calculated in accordance with the following formula:

$$ForecastDist_{j,t+uplink-1} = Dist_{j,t} + EstVelocity*(N-1) \quad (3)$$

Wherein, in the aforementioned formula (3), ForecastDist is an estimated distance between the user identified target and the pointing point of the imaging apparatus at the time the current command reaches the imaging apparatus, wherein Dist is the current distance between the user-identified target and the pointing point and EstVelocity is a vector denoting the estimated average velocity of the user-identified target at time t in each axis j.

Then, all commands that had been already transmitted by the user and have not yet been affected in the currently presented image are calculated in accordance with the following formula:

$$NotYetAffected_{j,t} = \sum_{l=t-N+1}^{t-l} Command_{j,t} \quad (4)$$

Wherein, in the aforementioned formula (4), NotYetAffected denotes a summation of all commands that had been already transmitted and have not yet been affected in the currently presented image.

Then, the estimated distance between the estimated location of the pointing point of the imaging apparatus and the estimated location user-identified target, at time t+uplink−1 which represent one cycle before the time in which presently transmitted commands reach the imaging apparatus, is calculated in accordance with the following formula:

$$ForecastTotDist_{j,t\_uplink-1} = ForecastDist_{j,t+uplink-1} - NotYetAffected_{j,t} \quad (5)$$

Wherein, in the aforementioned formula (5), ForecastTotDist is an estimated distance between the estimated location of the pointing point of the imaging apparatus and the estimated location of the user-identified target; ForecastDist is an estimated distance between the user identified target and the pointing point of the imaging apparatus one cycle before the time the current command reaches the imaging apparatus; and NotYetAffected denotes a summation of all commands that had been already transmitted by the user and have not yet been affected in the currently presented image.

Then, the required command for directing the imaging apparatus onto the user-identified target at time t is calculated in accordance with the following formula:

$$Command_{j,t} = EstVelocity_{j,t} + \frac{ForecastTotDist_{j,t+uplink-1}}{cyclesToOvertake} \quad (6)$$

Wherein, in the aforementioned formula (6), ForecasTotDist is the estimated distance between the estimated location of the pointing point of the imaging apparatus and the estimated location of the user-identified target; EstVelocity is a vector denoting the estimated average velocity of the user-identified target at time t in each axis j; and CyclesToOvertake is the number of cycles that is set for closure of the distance between the estimated location of the pointing point of the imaging apparatus and the estimated location of the user-identified target.

Figure 6:
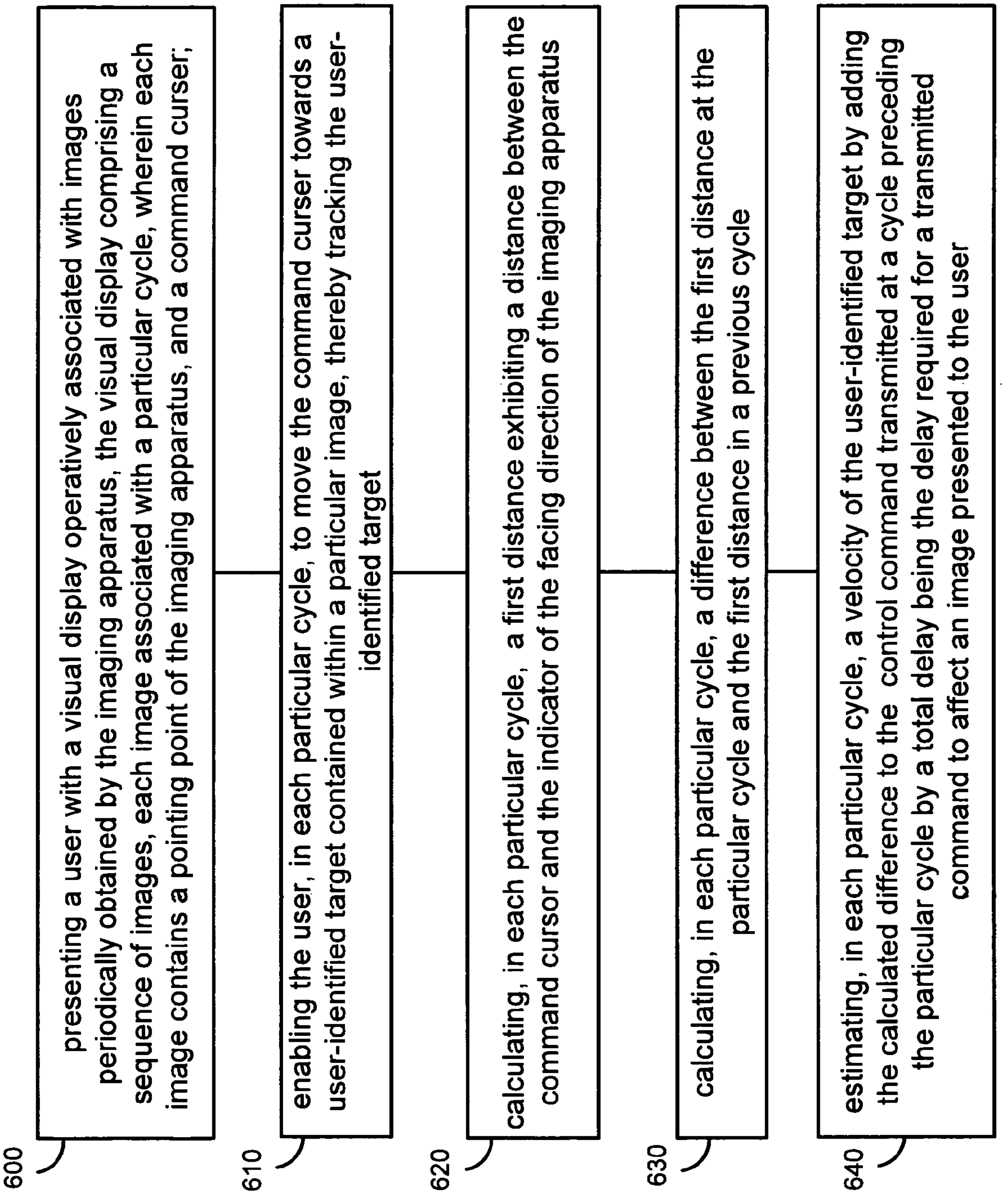
FIG. 6 and FIG. 7 show a high level flowchart illustrating an aspect of a method according to some embodiments of the invention.
Figure 7:
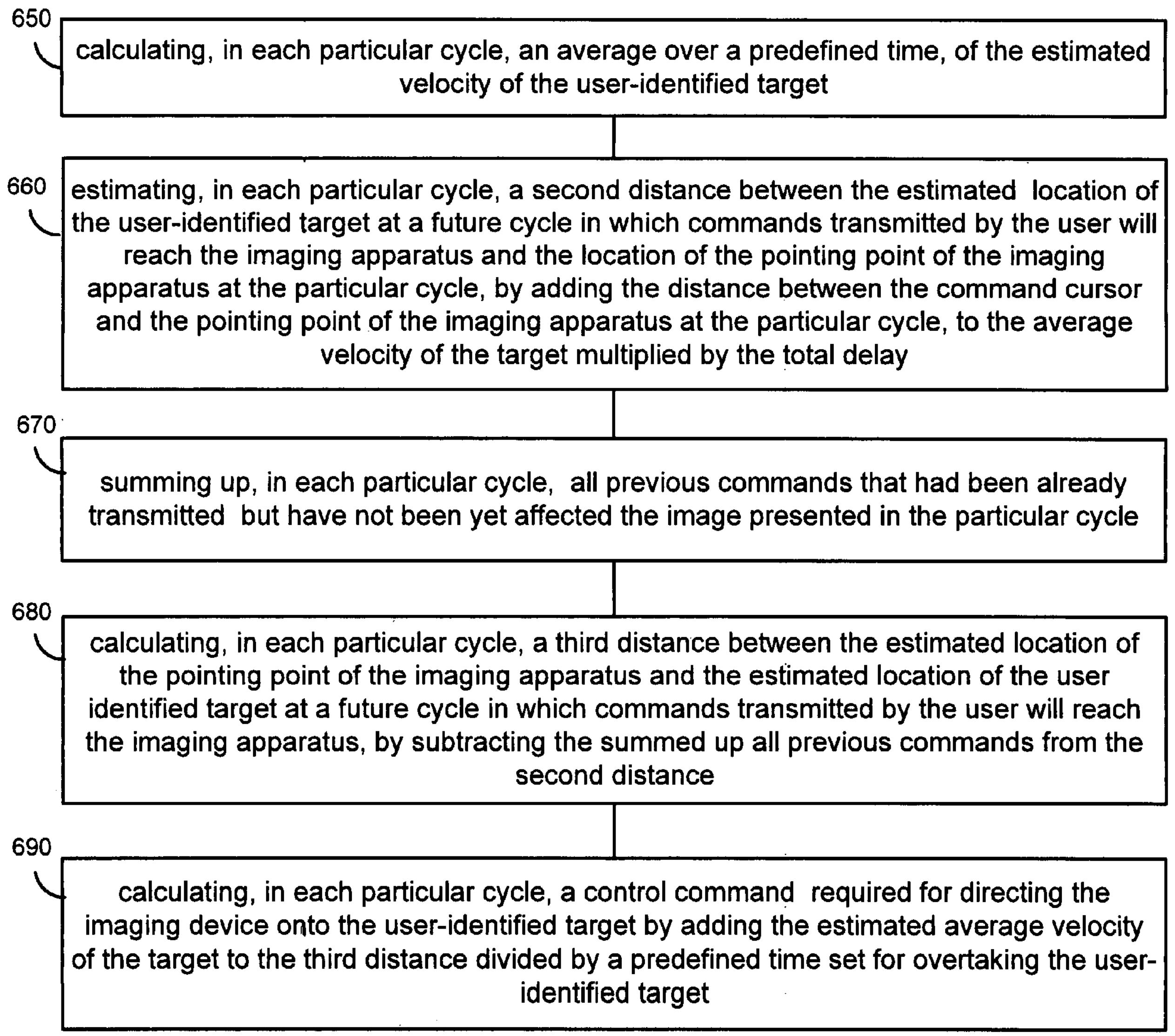

FIG. 6 and FIG. 7 show a high level flowchart illustrating an implementation of the aforementioned algorithm according to some embodiments of the invention. The flowchart shows a computer implemented method of controlling an imaging apparatus over a delayed communication link, by periodically transmitting a control command to the imaging apparatus, the method comprises: presenting a user with a visual display operatively associated with images periodically obtained by the imaging apparatus, the visual display comprising a sequence of images, each image associated with a particular cycle, wherein each image contains a pointing point of the imaging apparatus, and a command curser 600; enabling the user, in each particular cycle, to direct the command curser towards a user-identified target contained within a particular image, thereby tracking the user-identified target 610; calculating, in each particular cycle, a first distance exhibiting a distance between the command cursor and the indicator of the pointing point of the imaging apparatus 620; calculating, in each particular cycle, a difference between the first distance at the particular cycle and the first distance in a previous cycle 630; estimating, in each particular cycle, a velocity of the user-identified target by adding the calculated difference to the control command transmitted at a cycle preceding the particular cycle by a total delay being the delay required for a transmitted command to affect an image presented to the user 640; calculating, in each particular cycle, an average over a predefined time, of the estimated velocity of the user-identified target 650; estimating, in each particular cycle, a second distance between the estimated location of the user-identified target at a future cycle, one cycle before commands transmitted will reach the imaging apparatus and the location of the pointing point of the imaging apparatus at the particular cycle, by adding the distance between the command cursor and the pointing point of the imaging apparatus at the particular cycle, to the average velocity of the target multiplied by the total delay−1 660; summing up, in each particular cycle, all previous commands that had been already transmitted but have not been yet affected the image presented in the particular cycle 670; calculating, in each particular cycle, a third distance between the estimated location of the pointing point of the imaging apparatus and the estimated location of the user-identified target at a future cycle, one cycle before commands transmitted by the user will reach the imaging apparatus, by subtracting the summed up all previous commands from the second distance 680; and calculating, in each particular cycle, a control command required for directing the imaging device onto the user-identified target by adding the estimated average velocity of the target to the third distance divided by a predefined time set for overtaking the user-identified target 690.

According to some embodiments of the invention, calculating, in each particular cycle, a control command required for directing the pointing point of the imaging apparatus is followed by transmitting the calculated command to the imaging apparatus.

According to some embodiments of the invention, the command cursor is initially located on the pointing point of the imaging apparatus.

According to some embodiments of the invention, the pointing point of the imaging apparatus is located in the center of each image.

According to some embodiments of the invention, the velocity and distances are calculated in angular terms.

According to some embodiments of the invention, the averaged estimated velocity is averaged over the total delay.

According to some embodiments of the invention, the predefined time set for over-taking the user-identified target is set to the total delay.

Advantageously, the present invention is aimed for the unmanned aerial vehicle market (UAV/RPAs). However, it is understood that the necessary modification may be performed in order to support any kind of remote controlling of a device that is equipped with an imaging apparatus, over a delayed communication link, be it manned or unmanned. Such devices may comprise, but are not limited to: remote controlled weaponry, aerospace related device, submarines, surface vehicles and the like.

According to some embodiments of the invention, the disclosed method may be implemented in digital electronic circuitry, or in computer hardware, firmware, software, or in combinations thereof.

Suitable processors may be used to implement the aforementioned method. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage devices suitable for tangibly embodying computer program instructions and data include all forms of non-volatile memory, including by way of example semiconductor memory devices, such as EPROM, EEPROM, and flash memory devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of spatially directing an imaging apparatus over a communication link exhibiting an uplink delay and a downlink delay, by periodically transmitting a control command for directing the imaging apparatus, wherein the imaging apparatus periodically transmits to the user an image, and wherein the transmitted image is presented to the user and contains a pointing point of the imaging apparatus, the method comprising:

enabling the user to track a user-identified target on a currently presented image of the periodically transmitted images;

estimating a location of the user-identified target based on a tracking by the user, at a future time corresponding with the uplink delay, wherein the uplink delay is a time required for a command control currently transmitted by the user to reach the imaging apparatus;

estimating a location of a pointing point of the imaging apparatus, at a future time corresponding with the uplink delay;

calculating a distance between the estimated location of the user-identified target and the estimated location of the pointing point at the future time; and calculating a command control that will direct the pointing point onto the user-identified target, based on the calculated distance and all previous control commands that have been transmitted to the imaging apparatus but have not yet affected the currently presented image, wherein at least one of: the presenting, the estimating, and the calculating is performed by at least one computer.

2. The method according to claim 1, further comprising transmitting the calculated command to the imaging apparatus, after the calculating a command control.

3. The method according to claim 1, wherein each image comprises an array of pixels, and wherein distances are calculated by calculating differences in locations of corresponding pixels of successive images.

4. The method according to claim 1, wherein the differences are calculated in angular terms.

5. The method according to claim 1, wherein the pointing point of the imaging apparatus is located in a center of the image of a visual display.

6. The method according to claim 1, wherein the enabling is implemented by receiving an initial indication relating to the position of the user-identified target, and wherein the tracking is implemented automatically using machine vision techniques.

7. The method according to claim 1, wherein the enabling is implemented by receiving an initial indication relating to the position of the user-identified target, and wherein the tracking is implemented automatically using an external tracking means.

8. The method according to claim 1, wherein the enabling is implemented by presenting a command cursor over a visual display, and wherein the user permitted to move the command curser towards the user-identified target.

9. The method according to claim 8, wherein, initially, the command cursor is located on the pointing point of the imaging apparatus.

10. A computer program product for controlling an imaging apparatus over a delayed communication link, by periodically transmitting control commands to the imaging apparatus, the computer program product comprising:

a non-transitory computer readable storage medium having computer readable program embodied therewith, the computer readable program comprising:

computer readable program configured to present a user, via a visual display, with a sequence of images periodically obtained by the imaging apparatus, each image associated with a particular cycle, wherein each image includes a pointing point of the imaging apparatus, and a command curser;

computer readable program configured to enable the user, in each particular cycle, to move the command curser towards a user-identified target within an associated image, thereby tracking the user-identified target;

computer readable program configured to calculate, for each particular cycle, a first distance that is between the command cursor and the indicator of an orientation of the imaging apparatus;

computer readable program configured to calculate, for each particular cycle, a difference between a first distance in the particular cycle and the first distance in a previous cycle;

computer readable program configured to estimate, for each particular cycle, a velocity of the user-identified target by adding the calculated difference to a control command transmitted at a cycle preceding the particular cycle by a total delay that is required for a transmitted command to affect an image presented to the user;

computer readable program configured to calculate, for each particular cycle, an average over a predefined time, of the estimated velocity of the user-identified target;

computer readable program configured to estimate, for each particular cycle, a second distance that is between the estimated location of the user-identified target in a future cycle in which commands transmitted by the user will reach the imaging apparatus and the location of the pointing point of the imaging apparatus at the particular cycle, by adding the distance between the command cursor and the pointing point of the imaging apparatus at the particular cycle, to the average velocity of the target multiplied by the total delay;

computer readable program configured to sum-up, in each particular cycle, all previous commands that have been transmitted by the user but have not yet affected the image presented in the particular cycle;

computer readable program configured to calculate, for each particular cycle, a third distance that is between the estimated location of the pointing point of the imaging apparatus and the estimated location of the user identified target at a future cycle in which commands transmitted by the user will reach the imaging apparatus, by subtracting the summed up all previous commands from the second distance; and computer readable program configured to calculate, for each particular cycle, a control command that will direct the imaging device onto the user-identified target by adding the estimated average velocity of the target to the third distance divided by a predefined time set for overtaking the user-identified target.

11. The computer program product according to claim 10, further comprising computer readable program configured to initiate transmission the calculated command to the imaging apparatus.

12. The computer program product according to claim 10, wherein, the command cursor is initially located on the pointing point of the imaging apparatus.

13. The computer program product according to claim 10, wherein the pointing point of the imaging apparatus is located in the center of each image.

14. The computer program product according to claim 10, wherein the velocity and distances are calculated in angular terms.

15. The computer program product according to claim 10, wherein the averaged estimated velocity is averaged over the total delay.

16. The computer program product according to claim 10, wherein the predefined time set for overtaking the user-identified target is set to the total delay.

17. A system for spatially directing an imaging apparatus over a communication link exhibiting an uplink delay and a downlink delay, by periodically transmitting a control command for directing the imaging apparatus, wherein the imaging apparatus periodically transmits to the user an image, and wherein the transmitted image is presented to the user and contains a pointing point of the imaging apparatus, the system comprising:

a user interface configured to enable the user to track a user-identified target on a currently presented image of the periodically transmitted images; and a processor configured to:

estimate a location of the user-identified target based on a tracking by the user over the user interface, at a future time corresponding with the uplink delay, wherein the uplink delay is a time required for a command control currently transmitted by the user to reach the imaging apparatus;

estimate a location of a pointing point of the imaging apparatus, at a future time corresponding with the uplink delay;

calculate a distance between the estimated location of the user-identified target and the estimated location of the pointing point at the future time; and calculate a command control that will direct the pointing point onto the user-identified target, based on the calculated distance and all previous control commands that have been transmitted to the imaging apparatus but have not yet affected the currently presented image.

18. The system according to claim 17, further comprising a transmitting module configured to transmit the calculated command to the imaging apparatus, after the calculating a command control.

19. The system according to claim 17, wherein each image presented over the user interface comprises an array of pixels, and wherein distances are calculated by calculating differences in locations of corresponding pixels of successive images.

* * * * *